Figure 1:
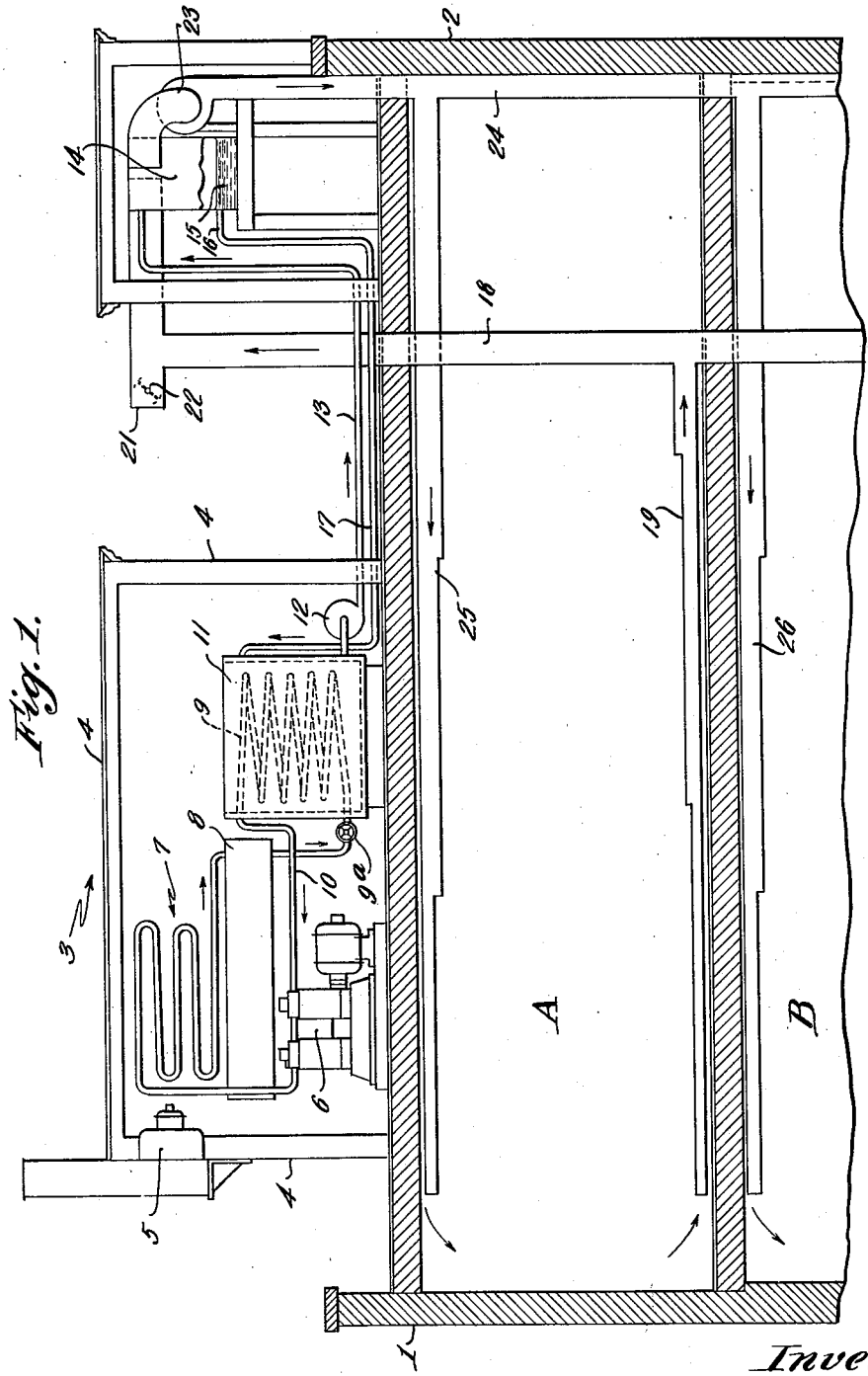

Nov. 21, 1939.  F. W. BINNS  2,180,624
METHOD OF REFRIGERATION AND BRINE COMPOSITION THEREFOR
Filed Jan. 20, 1936  2 Sheets-Sheet 2

Inventor,
Frederick W. Binns,
by Roberts, Cushman & Woodberry.
Att'ys

Patented Nov. 21, 1939

2,180,624

UNITED STATES PATENT OFFICE 2,180,624

METHOD OF REFRIGERATION AND BRINE COMPOSITION THEREFOR

Frederick W. Binns, Quincy, Mass., assignor to Virginia Smelting Company, Portland, Maine, a corporation of Maine Application January 20, 1936, Serial No. 59,880

8 Claims. (Cl. 62—101)

This invention relates to refrigerating, cooling, or air conditioning systems generally in which brine solutions, or the equivalent, are employed, and a method of treating such solutions to overcome the effects of any contamination of the same by objectionable refrigerant substances.

As is well known, and now widely practiced, an extensive and also intensive cooling effect may be set up by mechanically expanding a gas, or a liquid to form a gas, which incurs a marked absorption of heat,—and subsequently compressing such expanded gas or liquid, while cooling the same (usually through a narrower temperature range than the cooling effect) and repeating the cycle with the gas or liquid thus re-condensed.

While air or other innocuous gases may be employed in this refrigeration cycle, it requires large volumes of air to effect the absorption of large quantities of heat; and there are numerous other gases or liquids which are more effective for this purpose. Among the more commonly employed gases or liquids, at the present time, are sulphur dioxide, ammonia, methyl chloride, ethyl chloride, ether, carbon dioxide, etc.

Since some of these gases are decidedly annoying and disagreeable if they escape into the atmosphere,—but more particularly because they have a penetrating odor, they may, even though liberated in small amounts, cause an unwarranted hysteria, when noted by any considerable number of people. By some, it is thought that such an occurrence might even amount to the danger of panic, if it should happen among large crowds of people. It is therefore extremely important to avoid this hazard. It may be here observed that this psychological danger is generally recognized as being far greater than any real danger, from even the most faulty operation of the system as a whole. It is therefore all the more important to prevent, by eliminating any possible cause for it. Means have heretofore been taken to avoid such occurrence, by enclosing separate portions of the refrigerating unit, or the entire refrigerating unit in a gas-tight or substantially hermetically sealed chamber. The plant itself or the room in which it is contained may be enclosed with walls and doors, which, as a safety measure, may be closed by the operator or automatically, in case of faulty operation, accident and repairs, and is effective, on the premise that the operators will know when there is any serious danger and may leave safely themselves and close the unit from escape of gas into the air of the vicinity.

Such major precautions are, therefore, customarily taken in refrigeration or cooling plants. But, in the abstraction and transfer of heat from the various materials, rooms, or other spaces of various sorts which are to be cooled, chilled, or otherwise conditioned, it is common to employ a fluid transfer medium such as brine. This may be chilled in the refrigeration unit, pumped into contact with or adjacent to the spaces or areas to be cooled, from which it acquires heat, and then returned to the refrigerating unit, where it is again brought into heat transfer relationship to the expansion chamber, for refrigeration.

In the course of such operation of the system, it will be appreciated that losses of the expanding refrigerating gas may occur, by minute leakage between fittings, through fissures, if present, or by means of moving parts, induced by different pressures of the gas, adsorption, etc. If such escape of the refrigerant should occur, whatever the cause, it may find its way into the cooling fluid or brine solution, (or other heat transferring medium) in which it will ordinarily be dissolved or may simply be carried along by the circulating stream. In the case of very minute quantities, such absorption of the refrigerant gas may occur without detriment at the time or subsequently. On the other hand, such action is cumulative, and if appreciable amounts of the refrigerant are dissolved (or leak into the heat transfer medium without dissolution) they nevertheless tend to dissolve more readily in the chilled cooling solution, and subsequently to be rendered less soluble in such solutions as these latter are conducted through the cooling system in those places which are to be chilled thereby and in which the solution or medium itself becomes warmed up or appreciably heated. Accordingly in the latter portions of the system the temporarily dissolved refrigerant tends to separate in gaseous form again, and may be permitted to escape from such sections, through minute leaks or whenever the chilling solution is released in any way or for any purpose. Upon escape of such refrigerant into the air, the vicinity may become noticeably obnoxious and uncomfortably polluted or it may even become indetectably saturated, (if the gas is odorless) with a non-oxygen and hence suffocating gas,—which is perhaps the more dangerous of the two conditions. Nevertheless, the former condition, which is the more sharply apparent, is the more likely to attract attention of people in the vicinity and to arouse consternation and even fear, disproportionate to the real danger. And the panic effect and well-known consequences of such apprehensiveness, especially in crowds, makes the dangers from such excitement of paramount importance to prevent.

It is therefore an object of this invention to provide liquid media or solutions, suitable for use as a heat-transfer vehicle, which upon contact with refrigerants, either generally or particularly, shall be capable of absorbing and/or reacting upon the same in such a way as to retain them practically permanently against subsequent evolution and escape into the surrounding atmosphere. It is a further object to provide such a heat-transfer medium which shall be characterized not only by being substantially inert toward the mechanism and other surfaces of the system with which it may come into contact, but shall not interfere with nor appreciably reduce the heat-absorbing and heat-delivering values of the fluid, but may in fact enhance the same. A further object is to provide a vehicle which shall be effective automatically and under any and all conditions and circumstances of operation of the system, and which shall result in a relatively harmless solution, or vehicle, both toward the mechanism and containers of the refrigerating unit and of the cooling system,—as well as toward the human system itself, in a general way. It is also an object, however, to change the characteristics of the refrigerant which may enter the cooling solution in such a way as to diminish or eliminate its tendency to volatilize and escape therefrom, especially in a fugitive or gaseous condition. Other objects will appear from the following disclosure.

By the present invention it is more particularly provided to treat or prepare a fluid vehicle, intended for use as a conductive, transfer, and delivery medium, of heat, in which throughout the cycle of conditions involved in performing such functions, any refrigerant contacting therewith shall be converted to a substantially stable, inert and non-volatile product, and be retained therein without substantially increasing the vapor pressure of the resulting fluid, within the temperature and pressure ranges, within which the system is ordinarily operated. Since aqueous brines are commonly employed as the heat transfer medium, the invention will be described in terms of such brines as typical of the practice of the invention under general conditions of operation. The composition as well as concentration of such brines will be largely governed in terms of the temperature range, through which the usual or extreme conditions of operation of the refrigerating unit, will fluctuate. In general, of course, a relatively low freezing point is required,—and as a factor of safety—the brine will have a freezing point considerably below the ordinarily expected minimum. Thus while a brine containing 5% of ordinary salt will freeze at 27° F., a brine containing 15% will freeze at about 11° F. and a 20% brine at 1.5° F. On the other hand, a too concentrated salt solution is to be avoided because it introduces a heavy transfer medium to be circulated and may cause difficulty by precipitating some of the dissolved salt in the system.

On account of the relatively high concentration of salt in the brine, although any of the refrigerant gas or liquid which should find its way therein, might dissolve, if soluble in water, it would be readily expelled and hence separate; and the separate gas may form pockets in the system and cause various difficulties. On the other hand, if chemically reactive, it may react with the brine and thus form equally or more reactive substances such as hydrochloric acid or chlorine, for example.

According to the present invention, therefore, it is recommended to add to the transfer medium, such as salt brine, for example, a relatively inert, stable compound which shall be uniformly and permanently miscible or soluble therein, under the conditions of temperature, pressure, and concentration of the heat-transfer medium, in the circulating system, and which shall be capable of dissolving or reacting with the refrigerating medium to be used in the refrigerating unit to form a stable and permanent mixture or solution which will likewise persist under the conditions of temperature, pressure and concentration to which the heat-transfer medium may be subsequently subjected in the circulating system. It follows that the compound, to be added to the brine solution, or like heat-transfer medium, will be primarily related to the refrigerating medium which is to be employed in the refrigerating unit. It is found, for example, that when sulphur dioxide gas serves as the refrigerant medium and an aqueous brine as the heat-transfer medium, a treatment of the latter with a soluble, solid, non-volatile alkali such as sodium hydroxide (or better, potassium hydroxide) is effective to dissolve any of the acidic sulphur dioxide gas which may find its way therein, to form sodium sulphite which is likewise stable and freely soluble in the heat-transfer medium, and will circulate freely and continuously with the brine solution without separation therefrom.

An alkaline brine is also advantageous as effecting a substantial decrease in its reactivity upon metals and other surfaces to which it is presented and over which it may be passed. It is still further advantageous in some systems in which the brine solution is exposed, as for example in many instances of air conditioning. For such purposes, the cooled brine may be emitted from the circulating system and sprayed directly through the air to be cooled. In such operations, there may be some evaporation of the brine solution, thus tending to concentrate the solution which is returned to the system; or if the air to be cooled is humid, the brine spray may condense moisture from the air, which mixes with the brine, thus diluting it as it is returned to the system. But in such procedures, other factors may intervene, such as purification of the air which is thus treated or conditioned. Finely divided solids may be washed out and removed. And likewise various gases may be encountered which it is desirable to remove. Obviously it is especially desirable that the brine should not, upon being exposed and warmed, liberate any gas therefrom such as the refrigerant gases usually employed, namely, sulphur dioxide, carbon dioxide, etc. On the contrary, it is desirable that the brine shall be capable of absorbing such gases (both of which occur normally in the atmosphere, especially in or near cities) from the air or other material to be conditioned. For these purposes generally an alkaline brine is effective and convenient. Other gases or vapors also may be desirably removed, such as the evaporated moisture from human bodies (which is largely represented by acidic substances, aliphatic acids and aliphatic esters) various industrial or household odors, falling in various categories and arising from innumerable sources,—but generally tending to pollute the atmosphere, are predominantly acidic. Hence they are reacted upon by alkaline hydroxides to form salts,—and, with the solid and soluble alkali hydroxides, tend to form both stable and water soluble compounds, which will remain dissolved in brines and like heat-transfer media, throughout the circulating system.

In addition to or as an alternative of such absorption of objectionable gases from the atmosphere, it may be desirable to convert them more drastically than merely to a stabilized, soluble form, as thus indicated. In such event, it is found that many gases, and more particularly organic substances such as perspiration odors, or inorganic substances such as hydrogen sulphide, may be effectually destroyed by adding to the brine solution a suitable amount of an oxidizing agent such as sodium dichromate. This is, of course, applicable when the brine is intended for direct contact with the atmosphere or the like which is to be treated,—as by scrubbing, washing, etc. If treatment of air with both an alkali or acid and an oxidizing agent is found to be desirable, and the reagents to be used are incompatible, the air may be passed first into contact with one reagent and then with the other. The order of treatment will be determined by the specific reagents to be employed, the major impurities encountered, and the desired composition or condition of the treated air. For such purpose, a single refrigerating unit may be employed with two brine tanks—one containing and circulating an oxidizing brine and the other containing and circulating an acid, alkaline or organic solvent containing brine, simply duplicating the single compound which is to be described below. In other instances the alkaline and oxidizing reagents may be combined in the same brine solution.

When alkaline refrigerating gases are used, such as ammonia, a suitable reactive compound is found among the milder acids or acid salts which are soluble in the heat-transfer medium, such as sodium acid phosphate, or other polybasic acid salt, or the like, care being taken not to use a sufficiently acidic reagent to liberate hydrochloric acid, if salt is present in the brine solution. These are effective to react, however, with any alkaline refrigerant gas which may find its way into the circulating heat-transfer system and form soluble and more stable salts therewith, than the gas itself. Even though the gas may be directly soluble in the brine, it tends to be liberated, (as does ammonia for example) even at low temperature and exhibits a rapidly increasing vapor pressure under rising temperatures or lower pressures. By converting it to a stable soluble salt, or the like, however, in accordance with this invention, such subsequent separation is prevented.

It is also recognized that refrigerant gases may be used which are not acidic or alkaline, but which may present difficulties of the same general nature, in the event that they escape into the heat-transfer medium, and are circulated therewith. Such a refrigerant gas is exemplified by certain organic gases such as methyl chloride, ethyl chloride, propane, butane, iso-butane, etc. Upon reaching the warmer portions of the circulating system such gases may be liberated from solution or may collect to form pockets and escape from minute apertures, if present. They may go unnoticed, or may be objectionable, depending upon the specific conditions and properties in each case, but it is desirable to prevent such tendency to segregate and escape. To this end the heat-transfer medium or brine solution is preferably treated with a compound which is substantially non-volatile under the conditions involved and which is an active solvent of the refrigerant gas. The refrigerant gas may be appreciably soluble in water, as is ammonia gas or slightly, as is methyl chloride, but it is also readily expelled in the same way, and creates a partial pressure of its own from the surface of the liquid at relatively low temperatures. Such solubility, therefore, is not sufficient to prevent its liberation and escape, if suitable conditions and opportunity are afforded. On the other hand, if the heat-transferring medium is treated with a less volatile compound than water, which is also a better or more avid solvent of the refrigerant gas, it will selectively dissolve and retain such refrigerant gas and hence stabilize the resulting brine solution against its escape. With methyl chloride, as a refrigerant, for example, aniline or other amines may be used as a brine and will serve as an absorbent for any fugitive methyl chloride which may find its way therein from the refrigerating unit. Such dissolved methyl chloride will thereafter be retained in solution tenaciously by the aniline.

A typical and representative example of the procedure, composition and apparatus employed in carrying out the purpose of the invention will be described with reference to the conditioning and cooling of air, in which sulphur dioxide is employed as the refrigerant and brine is used as the heat-transfer medium, and the air to be conditioned is not only cooled but scrubbed by direct contact with the brine solution. It will be understood, however, that such application is not cited in limitation of the scope of the invention but for the purposes of illustrating its several features. The relative arrangement of the several parts of the apparatus, in general, is not confined to that shown, but will be considerably modified in accordance with the construction and arrangement of the building or other surroundings in which it is to be installed.

Figure 2:
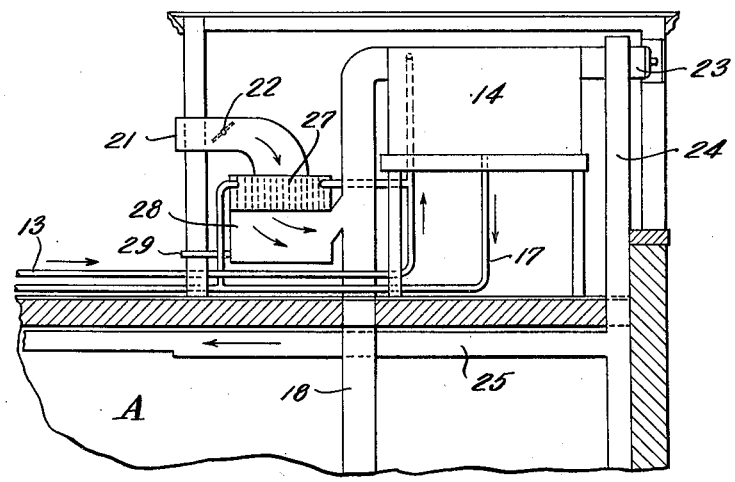

In the drawings:

Fig. 1 is a more or less diagrammatic side elevation of a complete system, as installed, for cooling and conditioning the air in a building of several stories, the equipment being located on the roof and the lower portion of the building being broken away; and Fig. 2 is a similar diagrammatic side elevation of a modification of the air conditioning portion of Fig. 1.

Referring to Fig. 1, the building is indicated by side walls 1 and roof 2, upon which is built an entirely enclosed refrigerating unit 3 having tight walls 4 and provided with an exhaust fan 5 to eliminate any gases which may escape into the atmosphere around the refrigerating unit. Therefore, as a unit, the refrigerating apparatus is independent of and separate from the building and any danger of direct escape of refrigerant gases from the refrigerating unit into the air in the building is positively prevented. The same arrangement would be provided if, as in some cases, the refrigerating unit were installed in the basement or other part of the building.

The refrigerating unit may consist, according to usual practices and construction, of a compressor 6, for compressing the refrigerant gas and delivering it to the (water cooled) condenser 7 from which the condensed gas passes into the receiver 8 and is thence released into the expansion coil 9 through expansion valve 9ª. The expanded gas leaves from the top of coil 9 and is returned to the intake side of the compressor 6, through the line 10. The expansion coil 9 is contained in a closed tank 11 which is filled with the brine solution. In the instant case, for example, the brine may consist of an aqueous solution containing 1¼ lbs. sodium hydroxide per gallon.

With a brine of such composition, and in a refrigerating or air-conditioning system as shown, it was found possible (though certainly not necessary) to employ such a quantity of brine that it was capable of completely and permanently dissolving more than twice the entire sulphur dioxide content of the refrigerating unit.

The chilled brine is preferably withdrawn from the bottom of the tank 11 by the pump 12, circulated through the pipe 13 to a spray (or like device, not shown) in the top of an air scrubber or washer chamber indicated at 14, in which the air is given a tortuous path (in various ways, as by baffles and the like, in accordance with usual practices) and the brine solution flows to the bottom of the chamber by gravity. The accumulating brine 15 in the bottom of the chamber overflows at 16, (or through a one-way valve, not shown) and is returned to the top of the brine tank 11, through pipe 17.

The atmosphere or air to be conditioned is drawn from the several rooms in the stories A, B, of the building below by means of a main return air duct 18 into which the air duct or air ducts 19 of each story lead, preferably from a position near the floor. In this respect, however, different constructions and different air conditioning systems and lay-outs follow different plans but in some cases it may be found desirable to withdraw the air from the rooms at a point near the ceiling, or from intermediate elevations.

In such systems, it is usually desirable to feed "make-up" or fresh air into the system, and this may be introduced into the main return air duct from a point outside the building, as shown at 21. The amount of fresh air thus introduced may be regulated in step with the operation of the unit as a whole by the control valve 22. The air then passes into the washing chamber, contacting with the chilled brine, passing over an extended surface wet therewith, and through the extensive dispersion of free droplets of the brine spray, so as to effect intimate and rapid contact therebetween.

In such contact, the air is chilled, its moisture content sharply reduced by condensation, and gaseous impurities such as carbon dioxide, aliphatic acids, hydrogen sulphide, etc. are dissolved and retained in permanently stable, soluble form therein. The chilled, purified and conditioned air is then withdrawn from the washer by fan 23 and forced into the main conditioned air duct 24 from which it is delivered through lateral distributing ducts 25, 26, to points at or near the ceilings of the rooms (or elsewhere) on the several floors of the building. Being cooler and drier than the atmosphere of the rooms, the fresh, conditioned air tends to fall to the bottom and eventually reaches the return air ducts, at or near the floor (as shown) where it again enters and passes through the cycle of circulating air for reconditioning.

Returning to the refrigerating unit, it is to be observed that this unit is entirely separated from the air circulating and conditioning unit, and that the only possible escape of refrigerant gas from the one to the other is through the circulating brine solution.

In the present application of the invention, however, where the brine is sprayed into direct contact with the air which is to be conditioned and returned directly to the rooms of dwellings, etc., it will be apparent that an exceedingly stringent requirement is placed upon the system, for the least escape of dissolved refrigerant (or other) gas from the brine solution would pass directly into the conditioned air stream and be immediately delivered into the rooms below. And yet such escape of dissolved gas or gases is positively and actually prevented, even under these exacting conditions of operation. It will therefore be obvious that it will be likewise effective in systems in which the brine is circulated, for cooling effect, in a closed pipe system for indirect cooling purposes, such as cold storage, household or apartment house refrigeration, and the like. It is also, of course, applicable in individual, small, household, store, hotel or industrial plant units, either fixed or portable, where the possibility of escape of the refrigerant gas is sought to be positively prevented.

In some localities or at certain seasons of the year, it is found, as indicated above, that the atmosphere to be conditioned is both warm and of high humidity. In such cases, the moisture is condensed and precipitated out of the air as it passes through the washer, and since it is in immediate contact with the chilling brine, the condensate unites with the brine, resulting in a continual dilution of the latter. This not only dilutes the brine but increases its volume, both of which changes affect the uniform operation of the system in various ways. It is therefore undesirable, if in large volume. To offset this occurence, however, the arrangement shown in Fig. 2 may be employed, in which the air returned through the main return air duct from the building may be regarded as relatively dry, but the fresh make-up air from the outside atmosphere is drawn, first into indirect contact with the brine, by passing over the outside of a supplementary brine coil 27, in chamber 28, and then into the stream of air from the main return air duct,—the two streams being mixed and introduced into the washing chamber, as before. In this way, the moisture in the make-up air from the outside atmosphere is condensed to liquid form and precipitated out, accumulating in the bottom of the chamber 28 and running to waste through drain 29. If necessary, the air from the main return air duct may also be thus subjected to preliminary cooling, by passing over the coil 27, but in continuous operation the repeatedly reconditioned air of the closed building will not acquire sufficient additional moisture to make it necessary. When the brine has absorbed an appreciable proportion of contaminant gases,—either by leakage thereto from the refrigerating unit or by scrubbing from the atmosphere, or both,—it will be replaced by a fresh solution. The absorption of carbon dioxide, in this manner, especially from rooms occupied by a number of people is rapid and relatively great in volume. It will not ordinarily be economical to recover the reagents, although this may be done in chemical ways such as treating with slaked lime, thus precipitating and removing calcium sulphite, calcium sulphate, calcium carbonate, etc.,—and at the same time revivifying, to a degree, the caustic soda content and perhaps forming and leaving soluble calcium salts in solution which are suitable as a component of the brine, though subject to possible precipitation of carbonate in the brine circulating system.

It will be readily understood by those skilled in the arts to which it may be applied, that various modifications and adaptations of the procedure, compositions, construction and arrangement may be made, in the practical utilization of my invention, but such modifications and adaptations are to be considered as comprehended by the present disclosure and included by the following claims.

I claim:

1. The method of refrigeration comprising the steps of bringing a heat transferring liquid into heat exchange relation with an expanding refrigerant gas and thence into heat conductive relation with the medium or substance to be cooled, said heat transferring liquid being inert with respect to the apparatus of the heat exchange system in which it is circulating, and being characterized by including a constituent of such character as to be reactive with said refrigerant gas to form a stable compound miscible with and non-separable from the heat transferring liquid by conditions brought about in the normal operation of the system and which compound is inert with respect to the system and does not interfere with the heat absorbing and heat delivery values of the liquid within the temperature and pressure ranges within which the system is ordinarily operated.

2. The method of refrigeration comprising the steps of bringing a heat transferring liquid into heat exchange relation with an expanding refrigerant gas and thence into heat conductive relation with the medium or substance to be cooled, said heat transferring liquid being inert with respect to the apparatus of the heat exchange system in which it is circulating, and being characterized by including a constituent of such character as to be reactive with said refrigerant gas to form a stable compound soluble in and non-separable from the heat transferring liquid by conditions brought about in the normal operation of the system and which compound is inert with respect to the system and does not interfere with the heat absorbing and heat delivery values of the liquid within the temperature and pressure ranges within which the system is ordinarily operated.

3. The method of refrigeration comprising the steps of bringing a heat transferring liquid into heat exchange relation with an expanding refrigerant gas and thence into heat conductive relation with the medium or substance to be cooled, said heat transferring liquid being inert with respect to the apparatus of the heat exchange system in which it is circulating, and being characterized by including an alkaline constituent of such character as to be reactive with said refrigerant gas to form a stable compound miscible with and non-separable from the heat transferring liquid by conditions brought about in the normal operation of the system and which compound is inert with respect to the system and does not interfere with the heat absorbing and heat delivery values of the liquid within the temperature and pressure ranges within which the system is ordinarily operated.

4. The method of refrigeration comprising the steps of bringing a heat transferring liquid into heat exchange relation with an expanding refrigerant gas and thence into heat conductive relation with the medium or substance to be cooled, said heat transferring liquid being inert with respect to the apparatus of the heat exchange system in which it is circulating, and being characterized by including an acidic constituent of such character as to be reactive with said refrigerant gas to form a stable compound miscible with and non-separable from the heat transferring liquid by conditions brought about in the normal operation of the system and which compound is inert with respect to the system and does not interfere with the heat absorbing and heat delivery values of the liquid within the temperature and pressure ranges within which the system is ordinarily operated.

5. The method of refrigeration comprising the steps of bringing a heat transferring liquid into heat exchange relation with an expanding refrigerant gas and thence into heat conductive relation with the medium or substance to be cooled, said heat transferring liquid being inert with respect to the apparatus of the heat exchange system in which it is circulating, and being characterized by including an organic constituent of such character as to be reactive with said refrigerant gas to form a stable compound miscible with and non-separable from the heat transferring liquid by conditions brought about in the normal operation of the system and which compound is inert with respect to the system and does not interfere with the heat absorbing and heat delivery values of the liquid within the temperature and pressure ranges within which the system is ordinarily operated.

6. A heat transferring liquid suitable for use in heat exchange relation with an expanding refrigerant gas, and in heat conductive relation with the medium or substance to be cooled, characterized by being inert with respect to the apparatus of the heat exchange system in which it is to be used and by including a constituent of such character as to be reactive with the refrigerant gas to form a stable compound miscible with and non-separable from the heat transferring liquid by conditions of normal operation of the system, without interfering with the heat absorbing and heat delivery values of the liquid within the temperature and pressure ranges within which the system is ordinarily operated.

7. A heat transferring liquid suitable for use in heat exchange relation with an expanding refrigerant gas, and in heat conductive relation with the medium or substance to be cooled, characterized by being inert with respect to the apparatus of the heat exchange system in which it is to be used and by including a constituent of such character as to be reactive with refrigerant gas to form a stable compound soluble in and non-separable from the heat transferring liquid by conditions of normal operation of the system, without interfering with the heat absorbing and heat delivery values of the liquid within the temperature and pressure ranges within which the system is ordinarily operated.

8. In combination, a refrigerant unit containing an expanding refrigerant gas, a cooling unit containing the medium or substance to be cooled, and a heat transferring liquid in heat exchange relation with the expanding gas and in heat conductive relation with the medium or substance to be cooled and circulated therebetween, said heat transferring liquid being inert with respect to the apparatus of the heat exchange system and including a constituent of such character as to be reactive with said refrigerant gas to form a stable compound miscible with and non-separable from the heat transferring liquid, and which is inert with respect to the system and does not materially interfere with the heat absorbing and heat delivering values of the heat transferring liquid within the temperature and pressure ranges within which the system is ordinarily operated.

FREDERICK W. BINNS.